United States Patent
Suzuki

(10) Patent No.: US 11,966,282 B2
(45) Date of Patent: Apr. 23, 2024

(54) MONITORING DEVICE AND MONITORING METHOD

(71) Applicant: TOSHIBA TEC KABUSHIKI KAISHA, Tokyo (JP)

(72) Inventor: Yuki Suzuki, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/962,561

(22) Filed: Oct. 10, 2022

(65) Prior Publication Data
US 2023/0236924 A1 Jul. 27, 2023

(30) Foreign Application Priority Data
Jan. 26, 2022 (JP) .................. 2022-010284

(51) Int. Cl.
G06F 11/00 (2006.01)
G06F 8/61 (2018.01)
G06F 11/07 (2006.01)

(52) U.S. Cl.
CPC ........... *G06F 11/0793* (2013.01); *G06F 8/61* (2013.01); *G06F 11/0736* (2013.01); *G06F 11/079* (2013.01)

(58) Field of Classification Search
CPC . G06F 11/0791; G06F 11/0736; G06F 11/079
USPC ........................................... 714/1–57
See application file for complete search history.

(56) References Cited

U.S. PATENT DOCUMENTS

| | | | |
|---|---|---|---|
| 7,505,461 B2 | 3/2009 | Matsuda et al. | |
| 7,694,191 B1* | 4/2010 | Bono | G06F 11/004 714/48 |
| 10,838,833 B1* | 11/2020 | Jibaja | G06F 11/2094 |
| 11,360,844 B1* | 6/2022 | Dodsley | G06F 11/1438 |
| 2002/0073364 A1 | 6/2002 | Katagiri | H04L 41/5032 714/48 |
| 2003/0226058 A1* | 12/2003 | Miller | G06F 11/1471 714/E11.13 |
| 2004/0078698 A1* | 4/2004 | Co | G01R 31/31713 714/42 |
| 2006/0253724 A1* | 11/2006 | Zhang | G06F 11/1451 714/E11.123 |
| 2013/0212432 A1* | 8/2013 | Guthrie | H04L 67/02 714/48 |
| 2016/0028761 A1* | 1/2016 | Sitsky | H04L 63/1416 726/23 |
| 2020/0356642 A1* | 11/2020 | Knutsson | G06F 21/12 |

* cited by examiner

*Primary Examiner* — Sarai E Butler
(74) *Attorney, Agent, or Firm* — Amin, Turocy & Watson, LLP

(57) ABSTRACT

According to one embodiment, there is provided a monitoring device for a terminal including a connection unit to which at least one device is able to be connected and mounted with a container file storing application software for controlling a business to be performed by using the device connected to the connection unit. The monitoring device includes a detection unit, an acquisition unit, and a processing unit. The detection unit detects an abnormality in the terminal. The acquisition unit acquires the container file mounted on the terminal in which the abnormality is detected. The processing unit installs the acquired container file on an alternative terminal.

20 Claims, 7 Drawing Sheets

| EPH CODE | STATUS |
|---|---|
| 100 | 0 or 1 or 2 |
| 200 | 0 or 1 or 2 |
| 300 | 0 or 1 or 2 |
| ⋮ | ⋮ |

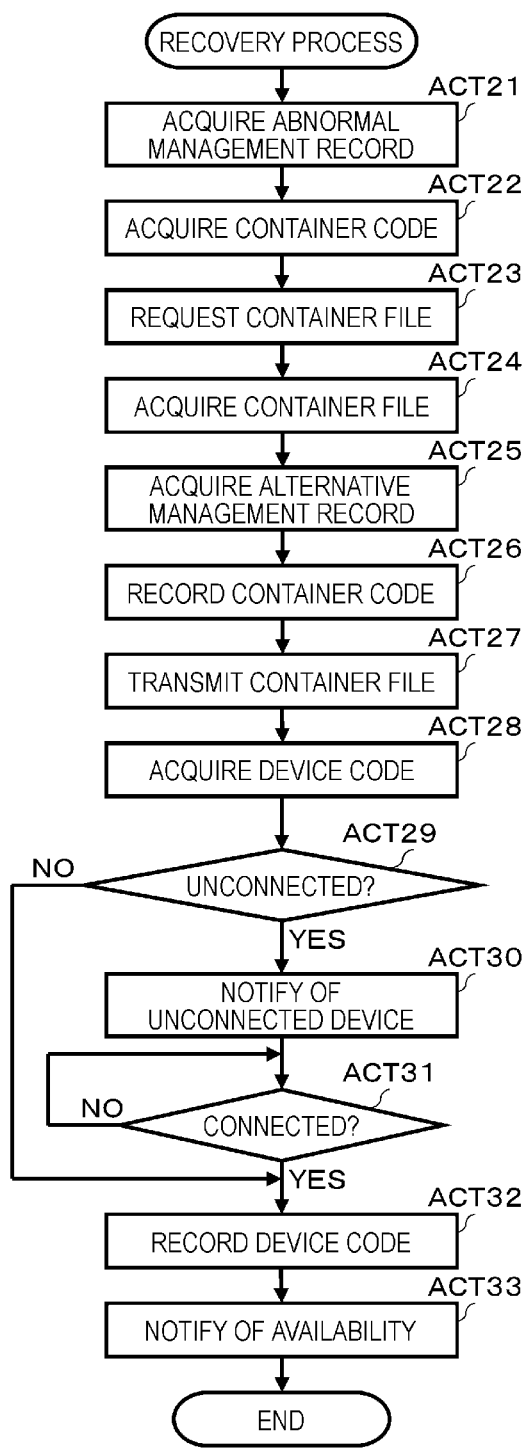

MONITORING DEVICE AND MONITORING METHOD

CROSS-REFERENCE TO RELATED APPLICATION

This application is based upon and claims the benefit of priority from Japanese Patent Application No. 2022-010284, filed on Jan. 26, 2022, the entire contents of which are incorporated herein by reference.

FIELD

Embodiments described herein relate generally to a monitoring device and a monitoring method.

BACKGROUND

In recent years, a technique for virtualizing a business terminal with a general-purpose terminal by connecting a device to a general-purpose terminal and installing business application software using the device is widespread. By adopting this virtualization technology, there is an advantage that the user can obtain a desired business terminal simply by preparing a general-purpose terminal and a necessary device.

However, if a terminal used as a business terminal fails, the user cannot use an alternative machine as a business terminal, simply by connecting the device to a general-purpose terminal prepared as the alternative machine. For example, a maintenance company needs to install necessary application software or the like on an alternative machine, which takes time and effort. Therefore, it is desired that a terminal used as a business terminal can be recovered quickly and easily by using an alternative machine, if an abnormality such as a failure occurs in the terminal.

DESCRIPTION OF THE DRAWINGS

FIG. 10 is a flow chart showing a procedure of main information processing executed by the processor of the relay server according to the monitoring program.

DETAILED DESCRIPTION

A concern addressed by an exemplary embodiment is to provide a monitoring device that enables recovery quickly and with a simple operation from the abnormality of a terminal.

In general, according to one embodiment, provided is a monitoring device for a terminal including a connection unit to which at least one device is able to be connected and mounted with a container file storing application software for controlling a business to be performed by using the device connected to the connection unit. The monitoring device includes a detection unit, an acquisition unit, and a processing unit. The detection unit detects an abnormality in the terminal. The acquisition unit acquires the container file mounted on the terminal in which the abnormality is detected. The processing unit installs the acquired container file on an alternative terminal.

Hereinafter, an embodiment of a monitoring device will be described with reference to the drawings.

The present embodiment illustrates a system of a retail store that uses a general-purpose terminal as a Point Of Sales (POS) business terminal and a person tracking business terminal.

[System Description]

Figure 1:
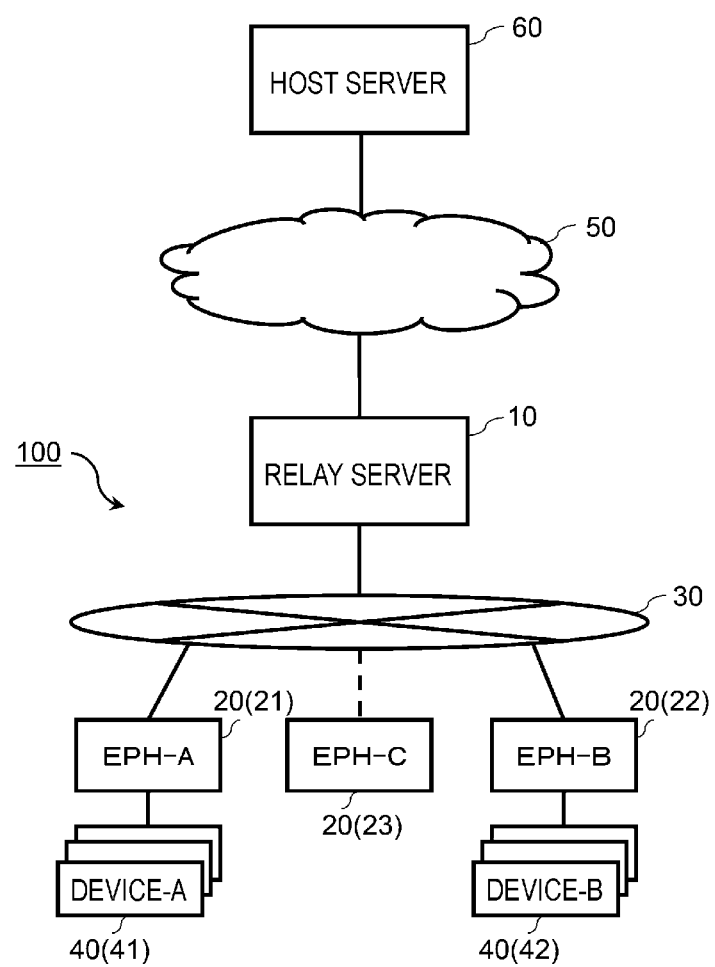
FIG. 1 is a schematic configuration diagram of a store system according to one embodiment.

FIG. 1 is a schematic configuration diagram of a store system 100 according to the present embodiment. The store system 100 includes a relay server 10, a general-purpose terminal 20, and a first communication network 30. The first communication network 30 is typically a Local Area Network (LAN) constructed in a retail store. The LAN may be a wired LAN or a wireless LAN. The first communication network 30 may be a network other than a LAN, or may be a network in which a LAN and another network are used in combination. The relay server 10 and the terminal 20 are each connected to the first communication network 30, and transmit and receive data signals between each other via the first communication network 30.

The terminal 20 is a computer terminal including a network connection unit for connection to the relay server 10 via the first communication network 30, and a device connection unit for connection to one or more devices 40. Such a terminal 20 can be referred to as an endpoint hub (EPH).

In FIG. 1, as the terminal 20, three terminals, that is, a first terminal (EPH-A) 21 virtualized as a first business terminal, a second terminal (EPH-B) 22 virtualized as a second business terminal, and an alternative third terminal (EPH-C) 23 are shown. In addition, the number of each of the first terminal 21, the second terminal 22, and the third terminal 23 is not limited to one.

The first terminal 21 is a general-purpose terminal 20 virtualized as a POS business terminal. The first terminal 21 is connected to a device (device-A) 41 required for POS business, as the device 40. The device 41 is, for example, a scanner, a touch panel, a card reader, or the like.

The second terminal 22 is a general-purpose terminal 20 virtualized as a person tracking business terminal. A device (device-B) 42 required for a person tracking business is connected to the second terminal 22, as the device 40. The device 42 is a plurality of person tracking cameras or the like mounted on the ceiling or the like of a store.

The third terminal 23 is an alternative machine if an abnormality such as a failure occurs in the first terminal 21 or the second terminal 22. The device 40 is not connected to the third terminal 23. The third terminal 23 may or may not be connected to the first communication network 30.

The relay server 10 is connected to a host server 60 via a second communication network 50. The second communication network 50 is typically the Internet. The second communication network 50 may be a wide area network other than the Internet, or may be a combination of the Internet and another wide area network.

The relay server 10 has a function of collecting data from the terminal 20 via the first communication network 30 and transmitting the data to the host server 60 via the second communication network 50. For example, the relay server 10 collects data related to a POS business from the first terminal 21 and transmits the data to the host server 60. For example, the relay server 10 collects data related to a person tracking business from the second terminal 22, and transmits the data to the host server 60. In this way, the relay server 10 functions as an edge gateway of the store system 100.

The host server 60 is a computer that processes the data received from the relay server 10 and provides the processed data to another computer. For example, the host server 60 provides data indicating sales, inventory, or the like of a store, obtained by processing data related to a POS business, to a computer terminal such as a personal computer, a tablet, or a smartphone. For example, the host server 60 provides data indicating a customer flow line, behavior, or the like, obtained by processing data related to a person tracking business, to a computer terminal such as a personal computer, a tablet, or a smartphone. Further, the host server 60 has a function of managing various container files described later. The host server 60 is prepared in, for example, a data center. The host server 60 may be prepared as a server for cloud computing.

In the store system 100 having such a configuration, the relay server 10 has a function as a monitoring device for the terminal 20. Therefore, the function as the monitoring device will be described in detail below. First, the configuration of the terminal 20 will be described, then the configuration of the relay server (monitoring device) 10 will be described, and then the operation of the relay server 10 will be described. These descriptions will clarify the function as the monitoring device.

[Terminal Configuration Description]

Figure 2:
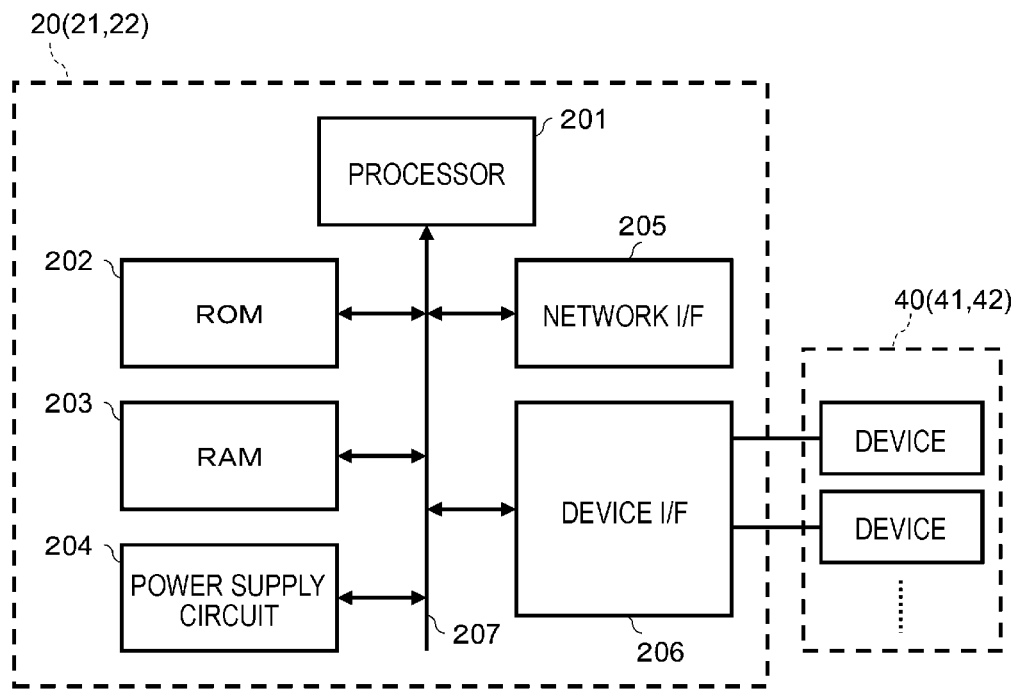
FIG. 2 is a block diagram showing a main circuit configuration of a terminal.

FIG. 2 is a block diagram showing a main circuit configuration of the terminal 20. The terminal 20 includes a processor 201, a read only memory (ROM) 202, a random access memory (RAM) 203, a power supply circuit 204, a network interface 205, a device interface 206, and a system transmission line 207, or the like. The system transmission line 207 connects the processor 201 and other units, and transmits data signals exchanged between each other. The terminal 20 configures a computer by connecting the processor 201, the ROM 202, the RAM 203, the power supply circuit 204, the network interface 205, and the device interface 206 via the system transmission line 107.

The processor 201 corresponds to the central portion of the computer. The processor 201 controls respective units to implement various functions as the terminal 20, according to an operating system or an application software. The processor 201 is, for example, a central processing unit (CPU).

The ROM 202 corresponds to the main memory of the computer. The ROM 202 stores the operating system and application software. Further, the ROM 202 stores the setting data necessary for the processor 201 to execute the application software.

The RAM 203 corresponds to the main memory of the computer. The RAM 203 includes a non-volatile memory area and a volatile memory area. The RAM 203 uses the volatile memory area as a work area into which data is rewritten by the processor 201. The RAM 203 may store application software, setting data, or the like in the non-volatile memory area.

The power supply circuit 204 generates a drive power supply for the terminal 20 from a commercial power supply. The terminal 20 is activated by the power supplied from the power supply circuit 204.

The network interface 205 connects to the first communication network 30. The network interface 205 transmits and receives data signals to and from the relay server 10 via the first communication network 30. The network interface 205 is an example of the network connection unit.

The device interface 206 is an interface for data communication with various devices 40 connected to the I/O port connector. The I/O port connector is, for example, a universal serial bus (USB) connector, a mini display port, a high-definition multimedia interface (HDMI), or the like. USB and HDMI are registered trademarks. The device interface 206 is an example of the device connection unit.

Figure 3:
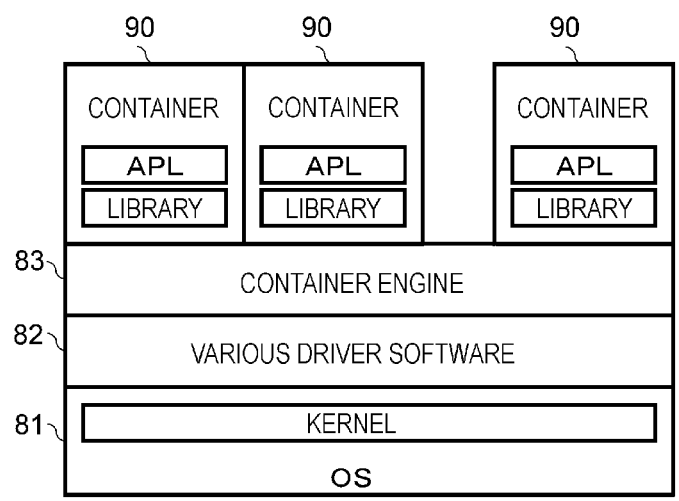
FIG. 3 is a schematic diagram showing a main program structure of the terminal.

FIG. 3 is a schematic diagram showing the main program structure of the terminal 20. The program of the terminal 20 includes an operating system (OS) 81 with the kernel as the core, various driver software 82 operating under the control of the OS 81, a container engine 83 operating under the control of the same OS 81, and one or a plurality of container files 90 operating on the container engine 83. The container file 90 is a program file that includes application software and library related to the application software.

The terminal 20 is virtualized as a business terminal depending on the type of container file 90 to be implemented.

Figure 4:
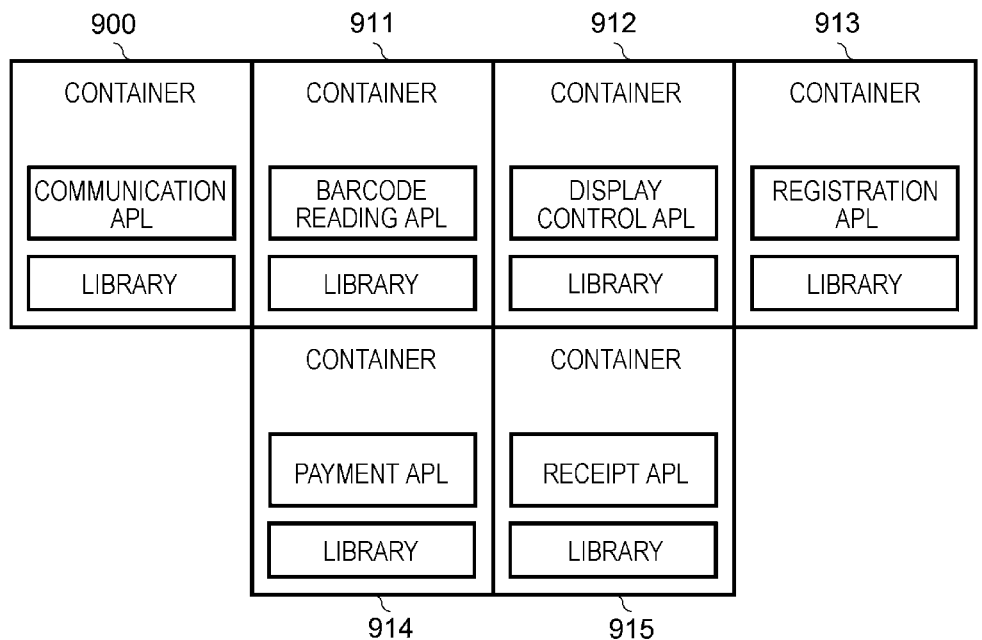
FIG. 4 is an example of a container file implemented in a first terminal.

FIG. 4 is an example of the container file 90 implemented in the first terminal 21 virtualized as a POS business terminal. As shown in FIG. 4, the first terminal 21 implements at least a total of six container files 900, 911, 912, 913, 914, and 915.

The container file 900 is a program file that includes application software for communication and a library. The application software for communication is software that controls data communication performed by the first terminal 21 via the relay server 10 and the first communication network 30.

The container file 911 is a program file that includes application software for reading barcodes and a library. The application software for reading barcodes is software that controls a scanner, which is a device 41 required for POS business, to read barcodes and the like attached to products.

The container file 912 is a program file that includes application software for display control and a library. The application software for display control is software for displaying an image on a touch panel, which is a device 41 required for POS business.

The container file 913 is a program file that includes application software for registration and a library. The application software for registration is software that registers product sales data based on the read barcode.

The container file 914 is a program file that includes application software for payment and a library. The application software for payment is software that settles a transaction based on the registered product sales data.

The container file 915 is a program file that includes application software for receipts and a library. The application software for receipts is software that controls a printer, which is a device 41 required for POS business, and issues a receipt showing the details of a settled transaction.

Figure 5:
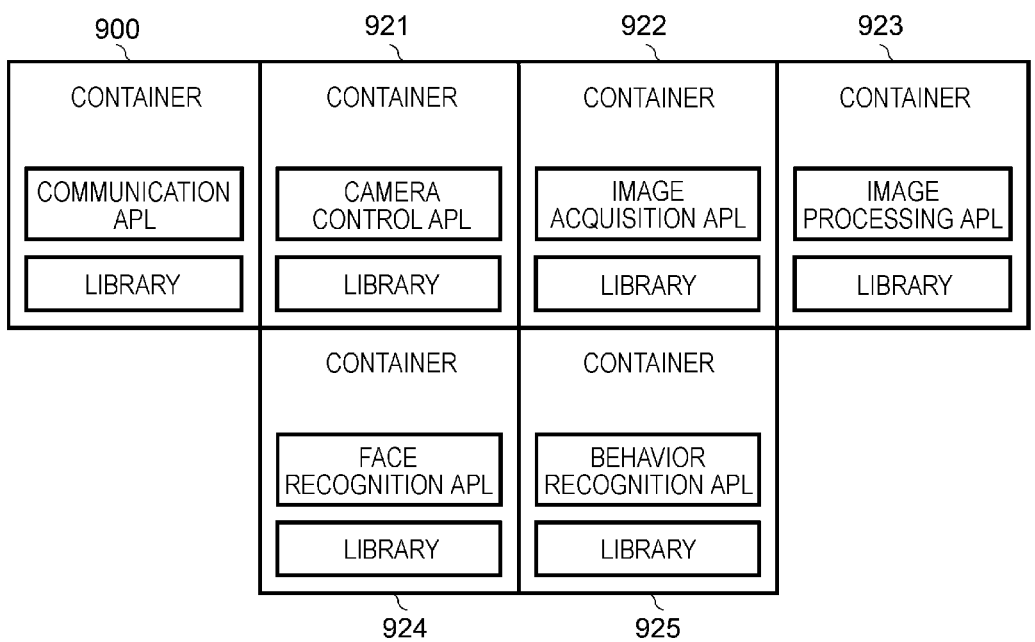
FIG. 5 is an example of a container file implemented in a second terminal.

FIG. 5 is an example of the container file 90 implemented in the second terminal 22 virtualized as a person tracking business terminal. As shown in FIG. 5, the second terminal 22 is virtualized as a second business terminal, that is, a person tracking business terminal, by implementing at least six container files 900, 921, 922, 923, 924, and 925.

The container file 900 is a program file that includes application software for communication and a library. The application software for communication is software that controls data communication performed by the second terminal 22 via the relay server 10 and the first communication network 30. Further, the container file 900 of the first terminal 21 shown in FIG. 4 and the container file 900 of the second terminal 22 shown in FIG. 5 are common.

The container file 921 is a program file that includes application software for camera control and a library. The application software for camera control is software that controls a camera, which is a device 42 required for a person tracking business, to perform an imaging operation.

The container file 922 is a program file that includes application software for image acquisition and a library. The application software for image acquisition is software for acquiring an image captured by a camera.

The container file 923 is a program file that includes application software for image processing and a library. The application software for image processing is software that performs a predetermined process on the image captured by a camera to acquire image information required for person tracking.

The container file 924 is a program file that includes application software for face recognition and a library. The application software for face recognition is software that recognizes a person's face from the image information required for person tracking.

The container file 925 is a program file that includes application software for behavior recognition and a library. The application software for behavior recognition is software that recognizes a person's behavior from the image information required for person tracking. The behavior includes a behavior of picking up a product, a behavior of returning a picked up product, a behavior of bending over in front of a product shelf, and the like.

Incidentally, even if the terminal 20 functions as any business terminal such as the first terminal 21 or the second terminal 22, data communication with the relay server 10 is indispensable, so that the container file 900 is required. Therefore, all the terminals 20 including the alternative third terminal 23 implement the container file 900 in advance. The other container files 911 to 915 and the container files 921 to 925 are appropriately installed on the terminal 20 from the relay server 10. That is, by installing the container files 911 to 915 from the relay server 10 on the terminal 20 on which the container file 900 is implemented in advance, the terminal 20 can become the first terminal 21. Similarly, by installing the container files 921 to 925 from the relay server 10 on the terminal 20 on which the container file 900 is implemented in advance, the terminal 20 can become the second terminal 22. Incidentally, the container files 911 to 915 and the container files 921 to 925 are managed by the host server 60.

Figure 6:
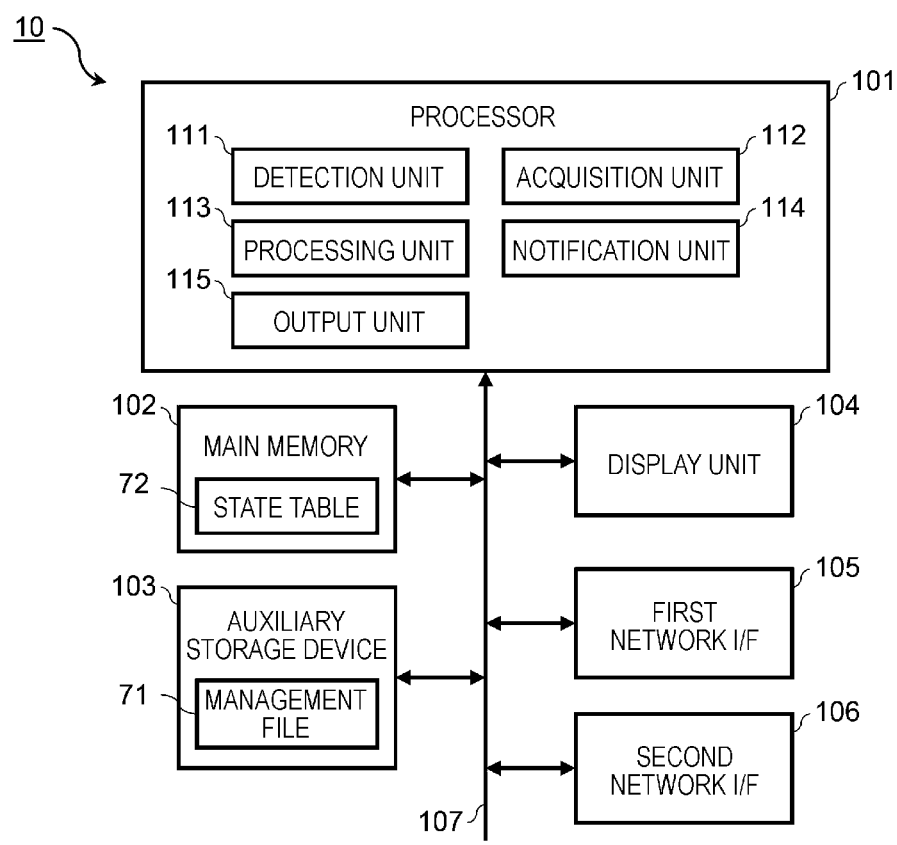
FIG. 6 is a block diagram showing a main circuit configuration of a relay server.

FIG. 6 is a block diagram showing a main circuit configuration of the relay server 10. The relay server 10 includes a processor 101, a main memory 102, an auxiliary storage device 103, a display unit 104, a first network interface 105, a second network interface 106, a system transmission line 107, and the like. The system transmission line 107 includes an address bus, a data bus, a control signal line, and the like. The system transmission line 107 connects the processor 101 and other units directly or via a signal input and output circuit, and transmits data signals exchanged between each other.

The relay server 10 configures a computer by connecting the processor 101, the main memory 102, the auxiliary storage device 103, the display unit 104, the first network interface 105, and the second network interface 106 via the system transmission line 107.

The processor 101 corresponds to the central portion of the computer. The processor 101 controls respective units to implement various functions as the relay server 10, according to an operating system or an application software. The processor 101 is, for example, a CPU.

The main memory 102 corresponds to the main memory of the computer. The main memory 102 includes a non-volatile memory area and a volatile memory area. The main memory 102 stores the operating system or application software in the non-volatile memory area. The main memory 102 may store data necessary for the processor 101 to execute processing for controlling each unit in a nonvolatile or volatile memory area. The main memory 102 uses the volatile memory area as a work area into which data is appropriately rewritten by the processor 101. The non-volatile memory area is, for example, a ROM. The volatile memory area is, for example, a RAM.

The auxiliary storage device 103 corresponds to the auxiliary storage portion of the computer. As the auxiliary storage device 103, for example, an electric erasable programmable read-only memory (EEPROM), a hard disk drive (HDD), a solid state drive (SSD), or the like can be used. The auxiliary storage device 103 stores data used by the processor 101 to perform various processes, data generated by the process performed by the processor 101, or the like. The auxiliary storage device 103 may also store the above application software.

The display unit 104 includes a device that displays various types of information in response to a command from the processor 101. The device is, for example, a liquid crystal display, an LED lamp, or the like. The display unit 104 may include an operation unit that receives an operation by an operator, for example, by adopting a touch panel structure.

The first network interface 105 connects to the first communication network 30. The first network interface 105 transmits and receives data signals to and from one or a plurality of terminals 20 via the first communication network 30.

The second network interface 106 connects to the second communication network 50. The second network interface 106 transmits and receives data signals to and from the host server 60 via the second communication network 50.

The relay server 10 having such a configuration uses a part of the storage area of the auxiliary storage device 103 as the area of the management file 71. Further, the relay server 10 uses a part of the volatile memory area in the main memory 102 as the area of the state table 72.

Figures 7, 8:
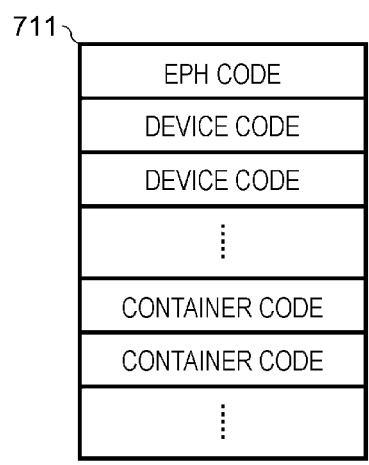
FIG. 7 is a schematic diagram showing a main data structure of a management record stored in a management file.
FIG. 8 is a schematic diagram showing a data structure of a state table.

FIG. 7 is a schematic diagram showing the main data structure of the management record 711 stored in the management file 71. The management file 71 stores a management record 711 configured for each terminal 20 connected via the first communication network 30. The EPH code is recorded in the management record 711. The EPH code is a terminal identification code for individually identifying the terminal 20. In each terminal 20, the EPH code of the terminal 20 is stored in the ROM 202.

Further, a plurality of device codes and container codes can be recorded in the management record 711. The device code is a device identification code set for each type of device 40 that can be connected to the terminal 20. The container code is a container identification code set for each type of the container file 90 that can be implemented by the terminal 20.

For example, the device code of each device 41 such as a scanner, a touch panel, and a card reader, and the container code of each of the container files 911 to 915 are recorded in the management record 711 in which the EPH code of the terminal 20 functioning as the first terminal 21 is recorded. Similarly, the device code of each device 42 such as a camera and the container code of each of the container files 921 to 925 are recorded in the management record 711 in which the EPH code of the terminal 20 functioning as the second terminal 22 is recorded. On the other hand, the device code and the container code are not recorded in the management record 711 in which the EPH code of the terminal 20 functioning as the third terminal 23 is recorded. The container code of the container file 900, which is commonly implemented by each terminal 20, may be recorded in advance in the management record 711 of each terminal 20.

Here, the management file 71 functions as a storage unit configured to store the container code that is the identification information of the container file 90 mounted on the terminal 20 in association with the terminal 20 to be monitored.

FIG. 8 is a schematic diagram showing the data structure of the state table 72. The state table 72 is a data table that stores status data in association with the EPH code of each terminal 20. The status data has a value of, for example, "0", "1", or "2". This value changes depending on the state of the terminal 20. In the present embodiment, the value of the status data of the terminal 20 whose power is turned off is set to "0". The value of the status data of the terminal 20 whose power is turned on and which is operating as a business terminal is set to "1". The status data of the terminal 20 that is down due to an abnormality such as a failure during operation as a business terminal is set to "2".

In the relay server 10 having such a configuration, the processor 101 functions as a detection unit 111, an acquisition unit 112, a processing unit 113, a notification unit 114, an output unit 115, and the like, as shown in FIG. 6.

The detection unit 111 is a unit configured to detect an abnormality in the first terminal 21 or the second terminal 22 operating as a business terminal.

The acquisition unit 112 is a unit configured to acquire the container file 90 mounted on the first terminal 21 or the second terminal 22 in which the abnormality is detected. Specifically, the acquisition unit 112 acquires the container codes of the container files 911 to 915, if an abnormality of the first terminal 21 is detected. If an abnormality of the second terminal 22 is detected, the acquisition unit 112 acquires the container codes of the container files 921 to 925.

The processing unit 113 is a unit configured to install the container file 90 identified by the container code acquired by the acquisition unit 112 on an alternative terminal, for example, the third terminal 23.

The notification unit 114 is a unit configured to notify that an abnormality in the first terminal 21 or the second terminal 22 is detected.

The output unit 115 is a unit configured to output a connection request for the device 40, if the device 40 connected to the device connection unit of the first terminal 21 or the second terminal 22 in which the abnormality is detected is not connected to the alternative terminal. Specifically, the output unit 115 outputs a connection request for the device 41, if an abnormality of the first terminal 21 is detected, for example, if the device 41 is not connected to the third terminal 23. The output unit 115 outputs a connection request for the device 42, if an abnormality of the second terminal 22 is detected, for example, if the device 42 is not connected to the third terminal 23.

The detection unit 111, the acquisition unit 112, the processing unit 113, the notification unit 114, and the output unit 115 are implemented by the processor 101 executing information processing according to the monitoring program.

The monitoring program is application software stored in the main memory 102 or the auxiliary storage device 103. The method of installing the monitoring program in the main memory 102 or the auxiliary storage device 103 is not particularly limited. The monitoring program can be installed in the main memory 102 or the auxiliary storage device 103 by being recorded on a removable recording medium, or being distributed by communication via a network. The recording medium may be in any form as long as the recording medium can store a program such as a CD-ROM or a memory card and the device can read the recording medium.

[Relay Server Operation Description]

Figure 9:
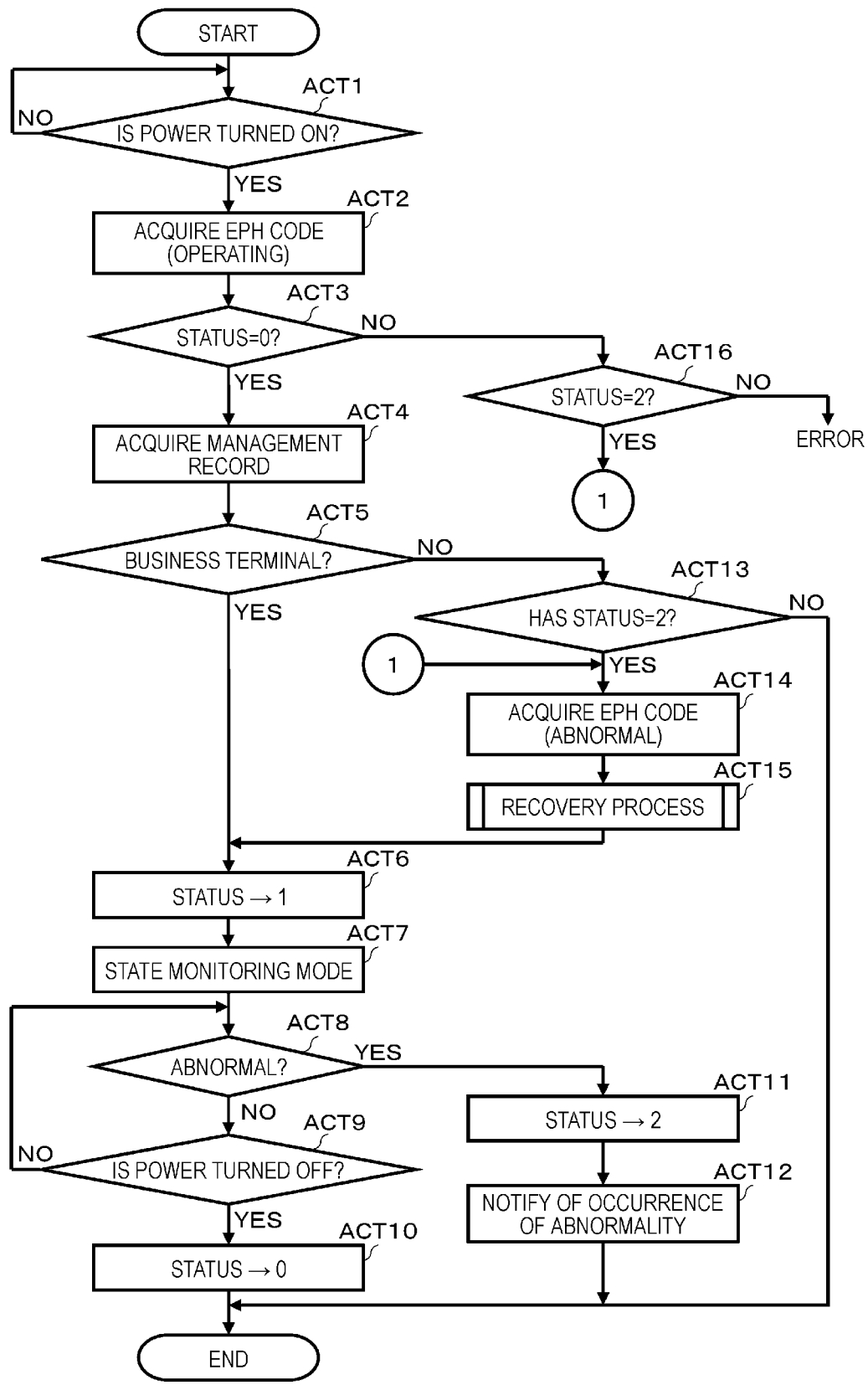
FIG. 9 is a flow chart showing a procedure of main information processing executed by a processor of the relay server according to a monitoring program.

FIGS. 9 and 10 are flow charts showing a procedure of main information processing executed by the processor 101 of the relay server 10 according to the monitoring program. Hereinafter, the main operation of the relay server 10 will be described with reference to each figure. The information processing procedure shown in the flow chart is not limited thereto. If the same action effect can be obtained, it can be changed as appropriate.

The processor 101 waits for the power of the terminal 20 to be turned on, as ACT 1. If the terminal 20 is started up by the drive power supply from the power supply circuit 204, the container engine 83 operates under the control of the OS 81, and the communication application software of the container file 900 is started. Upon this activation, the processor 201 of the terminal 20 outputs a power-on signal to the relay server 10. The power-on signal includes the EPH code of the terminal 20. Such an operation of the terminal 20 is common to the first terminal 21, the second terminal 22, and the third terminal 23 in which the container file 900 is stored in advance.

When receiving the power-on signal from the terminal 20 via the first network interface 105, the processor 101 of the relay server 10 proceeds to ACT 2. The processor 101 acquires an EPH code from the power-on signal, as ACT 2.

Here, for convenience of description, the terminal 20 that transmits the power-on signal is referred to as an operating terminal 241. The operating terminal 241 can be the first terminal 21, the second terminal 22, or the third terminal 23. The processor 101 executes ACT 2 and subsequent processes for the operating terminal 241. If a power-on signal is received from another terminal 20 during the execution of this process, the processor 101 also executes ACT 2 and subsequent processes for the terminal 20 in parallel.

The processor 101 that completes the process of ACT 2 searches the state table 72, as ACT 3. Then, the processor 101 checks whether or not the status value recorded in association with the EPH code of the operating terminal 241 is "0". If the status value is "0", that is, if the operating terminal 241 is the terminal 20 whose power is turned off without causing an abnormal state such as a failure, the processor 101 proceeds to ACT 4. The processor 101 acquires the management record 711 including the EPH code of the operating terminal 241 from the management file 71, as ACT 4.

The processor 101 checks whether or not the operating terminal 241 is a virtualized terminal as a business terminal, as ACT 5. Specifically, the processor 101 checks whether or not one or a plurality of device codes or container codes are recorded in the acquired management record 711. If the device code or the container code is recorded, the processor 101 recognizes that the operating terminal 241 is a business terminal, for example, the first terminal 21 or the second terminal 22. If the device code and the container code are not recorded, the processor 101 recognizes that the operating terminal 241 is the general-purpose terminal 20 that is not operating as a business terminal, for example, the third terminal 23.

If the operating terminal 241 is the first terminal 21 or the second terminal 22, the processor 101 proceeds to ACT 6. The processor 101 updates the status value recorded in the state table 72 in association with the EPH code of the operating terminal 241 from "0" to "1", as ACT 6. Then, the processor 101 proceeds to ACT 7.

The processor 101 enters a state monitoring mode for monitoring the state of the operating terminal 241, as ACT 7. In the state monitoring mode, the processor 101 periodically outputs a state monitoring signal to the operating terminal 241 via the first network interface 105. The processor 201 of the operating terminal 241 that receives the state monitoring signal returns the response signal to the relay server 10 if it is in a normal state. The processor 101 recognizes that the operating terminal 241 is normal while receiving the response signal from the operating terminal 20. If the response signal from the operating terminal 241 is interrupted, the processor 101 recognizes that the operating terminal 241 is down due to an abnormality. Further, if the power is turned off, the operating terminal 241 outputs a power-off signal to the relay server 10 and then is down. Therefore, when receiving the power-off signal from the operating terminal 20, the processor 101 recognizes that the power of the operating terminal 241 is turned off.

The processor 101 that enters the state monitoring mode checks whether or not an abnormality occurs in the operating terminal 241, as ACT 8. If no abnormality occurs, the processor 101 proceeds to ACT 9. The processor 101 checks whether or not the power of the operating terminal 241 is turned off, as ACT 9. If the power is not turned off, the processor 101 returns to ACT 8. In this way, the processor 101 monitors whether the power of the operating terminal 241 is turned off or that an abnormality occurs before the power is turned off.

If the power is turned off without causing an abnormality in the operating terminal 241, the processor 101 proceeds to ACT 10. The processor 101 searches the state table 72, as ACT 10. Then, the processor 101 updates the status value recorded in association with the EPH code of the operating terminal 241 from "1" to "0". With the above, the processor 101 ends the information processing for the operating terminal 241.

On the other hand, if it is detected that an abnormality occurs in the operating terminal 241 before the power is turned off, the processor 101 proceeds to ACT 11. The processor 101 searches the state table 72, as ACT 11. Then, the processor 101 updates the status value recorded in association with the EPH code of the operating terminal 241 from "1" to "2". Further, the processor 101 performs a process for notifying that an abnormality occurs in the operating terminal 241, as ACT 12. For example, the processor 101 displays, on the display unit 104, a message for notifying that an abnormality occurs in the operating terminal 241 to make a notification. For example, the processor 101 may make a notification by transmitting an e-mail for notifying that an abnormality occurs in the operating terminal 241 to a communication medium such as a smartphone carried by the user of the system via the Internet.

Here, the processor 101 functions as the detection unit 111 by the process of ACT 8 and ACT 11. In addition, the processor 101 functions as the notification unit 114 by the process of ACT 12.

If the process of ACT 11 and ACT 12 is completed, the processor 101 ends the information processing for the operating terminal 241.

Incidentally, in ACT 5, if the operating terminal 241 is not a business terminal but the third terminal 23, the processor 101 proceeds to ACT 13. The processor 101 searches the state table 72, as ACT 13. Then, the processor 101 checks whether or not there is an EPH code with an associated status value of "2". If there is no EPH code with a status value of "2", no alternative terminal is needed. The processor 101 ends the information processing for the operating terminal 241.

On the other hand, if there is an EPH code with a status value of "2", the processor 101 proceeds to ACT 14. The processor 101 acquires the EPH code, as ACT 14. If there are a plurality of EPH codes with a status value of "2", the processor 101 acquires any one of the EPH codes. As described above, the EPH code acquired in ACT 14 is the EPH code of the business terminal in which the abnormality is detected. In the following, the business terminal in which the abnormality is detected will be referred to as an abnormal terminal 242. That is, the EPH code acquired in ACT 14 is the EPH code of the abnormal terminal 242.

The processor 101 that acquires the EPH code of the abnormal terminal 242 executes a recovery process, as ACT 15. The recovery process will be described later.

Further, if the status value associated with the EPH code of the operating terminal 241 is not "0" as a result of searching the state table 72 in ACT 3, the processor 101 proceeds to ACT 16. The processor 101 checks whether or not the status value is "2", as ACT 16. If the status value is not "2", that is, is "1", it means that a system abnormality occurs in which a power-on signal is output from the operating terminal 241. In this case, the processor 101 ends the information processing according to the monitoring program as an error. Incidentally, if an information processing error occurs, it is assumed that system maintenance will be performed.

On the other hand, if the status value is "2", that is, if the abnormal terminal 242 is recovered and the power is turned on again, the processor 101 proceeds to ACT 14 described above. That is, the processor 101 reacquires the EPH code of the operating terminal 241 acquired in ACT 2 as the EPH code of the abnormal terminal 242. After that, the processor 101 executes the recovery process.

FIG. 10 is a flow chart showing a main procedure of the recovery process. The processor 101 searches the management file 71 and acquires the EPH code acquired in the process of ACT 14, that is, the management record 711 including the EPH code of the abnormal terminal 242, as ACT 21. Hereinafter, this management record 711 is referred to as an abnormality management record 7111. Since at least one device code and container code are recorded in the abnormality management record 7111, the processor 101 acquires all the container codes from the abnormality management record 7111, as ACT 22.

The processor 101 requests the host server 60 for a container file identified by all the container codes acquired from the abnormality management record 7111. Specifically, the processor 101 transmits a container request command to the host server 60 via the second network interface 106. The container request command includes all the container codes acquired from the abnormality management record 7111.

The host server 60 manages a data file in which various container files 90 are collected. The host server 60 that receives the container request command detects the container file 90 identified by the container code included in the container request command from this data file. Then, the host server 60 transmits a response command including all the detected container files to the relay server 10 of the container request command transmission source via the second communication network 50.

The processor 101 of the relay server 10 that receives the response command from the host server 60 acquires the container file included in the response command, as ACT 24.

The processor 101 acquires the EPH code of the operating terminal 241, that is, the management record 711 including the EPH code acquired in ACT 2 from the management file 71, as ACT 25. Hereinafter, this management record will be referred to as an alternative management record 7112. The processor 101 records all the container codes acquired from the abnormality management record 7111 in the alternative management record 7112, as ACT 26. Further, the processor 101 transmits all the container files 90 acquired from the host server 60 to the operating terminal 241 via the first communication network 30 for installation, as ACT 27.

If the operating terminal 241 is the first terminal 21 or the second terminal 22 recovered from the abnormality, the same container file 90 as the installed container file 90 is stored in the first terminal 21 or the second terminal 22. However, the container file 90 may be corrupted. Therefore, in the first terminal 21 or the second terminal 22, the installed container file 90 is overwritten and stored.

Here, the processor 101 functions as the acquisition unit 112 by the process of ACT 21 to ACT 24. Further, the processor 101 functions as the processing unit 113 by the process of ACT 27.

After installing the container file 90 on the operating terminal 241, the processor 101 acquires all the device codes from the abnormality management record 7111, as ACT 28. Then, the processor 101 checks whether or not all the devices 40 identified by the device code are connected to the device interface 206 of the operating terminal 241.

If all devices 40 are connected to the device interface 206, the processor 101 proceeds to ACT 32. The processor 101 records all the device codes acquired from the abnormality management record 7111 in the alternative management record 7112, as ACT 32. After that, the processor 101 performs a process for notifying that the operating terminal 241 is available, as ACT 33. For example, the processor 101 displays, on the display unit 104, a message for notifying that the operating terminal 241 is available to make a notification. For example, the processor 101 may make a notification by transmitting an e-mail for notifying that the operating terminal 241 is available to a communication medium such as a smartphone carried by the user of the system.

In ACT 29, if at least a part of the devices 40 identified by the device code is not connected to the device interface 206 of the operating terminal 241, the processor 101 proceeds to ACT 30. The processor 101 performs a process for providing a notification of an unconnected device, as ACT 30. For example, the processor 101 displays a message for providing a notification of the type of the unconnected device on the display unit 104 to make a notification. For example, the processor 101 may make a notification by transmitting an e-mail for providing a notification of the type of the unconnected device to a communication medium such as a smartphone carried by the user of the system.

The processor 101 waits for all the devices 40 identified by the device code to be connected to the device interface 206 of the operating terminal 241, as ACT 31. Then, if all the devices 40 are connected, the processor 101 proceeds to ACT 32 described above. That is, the processor 101 records all the device codes acquired from the abnormality management record 7111 in the alternative management record 7112. Further, the processor 101 performs a process for notifying the availability of the operating terminal 241.

Here, the processor 101 functions as the output unit 115 by the process of ACT 29 and ACT 30.

With the above, the processor 101 ends the recovery process. After that, the processor 101 proceeds to ACT 6 in FIG. 9. That is, the processor 101 changes the status value associated with the EPH code of the operating terminal 241 from "0" or "2" to "1". Then, the processor 101 enters the state monitoring mode. Since the process after the state monitoring mode is as described above, the description here is not repeated.

[System Action and Effect Description]

Next, the action and effect of the store system 100 will be described with specific examples.

For example, it is assumed that the first terminal 21 virtualized as the POS business terminal is down due to a failure. In this case, the status value associated with the EPH code of the first terminal 21 is updated from "1" to "2". Further, it is notified that an abnormality occurs in the first terminal 21.

The user of the store system 100 connects the alternative third terminal 23 to the first communication network 30 instead of the first terminal 21 in which the failure occurs. Then, the power of the third terminal 23 is turned on. Before turning on the power, the user may or may not connect the device 41 connected to the first terminal 21 in which the failure occurs, to the device interface 206 of the third terminal 23.

If the power of the third terminal 23 is turned on, the container code and the device code are not recorded in the management record 711 in which the EPH code of the third terminal 23 is recorded, so that the recovery process is executed with the EPH code with the status of "2", that is, the EPH code of the failed first terminal 21 as the EPH code of the abnormal terminal 242 and the EPH code of the third terminal 23 as the EPH code of the operating terminal 241.

As a result, container files 911 to 915 similar to the container files installed on the first terminal 21 are installed on the third terminal 23. Then, if the device 41 is connected to the third terminal 23, it is notified that the third terminal 23 is available. That is, the third terminal 23 can be used as an alternative machine for the first terminal 21.

On the other hand, if the device 41 is not connected to the third terminal 23, a notification indicating that the device 41 is to be connected is performed. Therefore, the user connects the device 41 to the device interface 206 of the third terminal 23. In this way, if all the necessary devices 41 are connected to the third terminal 23, it is notified that the third terminal 23 is available. That is, the third terminal 23 can be used as an alternative machine for the first terminal 21.

Next, it is assumed that the second terminal 22 virtualized as the person tracking business terminal is down due to a failure. In this case, the status value associated with the EPH code of the second terminal 22 is updated from "1" to "2". Further, it is notified that an abnormality occurs in the second terminal 22.

The user of the store system 100 connects the alternative third terminal 23 to the first communication network 30 instead of the second terminal 22 in which the failure occurs. Then, the power of the third terminal 23 is turned on. Before turning on the power, the user may or may not connect the device 42 connected to the second terminal 22 in which the failure occurs, to the device interface 206 of the third terminal 23.

If the power of the third terminal 23 is turned on, the container code and the device code are not recorded in the management record 711 in which the EPH code of the third terminal 23 is recorded, so that the recovery process is executed with the EPH code with the status of "2", that is, the EPH code of the failed second terminal 22 as the EPH code of the abnormal terminal 242 and the EPH code of the third terminal 23 as the EPH code of the operating terminal 241.

As a result, container files 921 to 925 similar to the container files installed on the second terminal 22 are installed on the third terminal 23. Then, if the device 42 is connected to the third terminal 23, it is notified that the third terminal 23 is available. That is, the third terminal 23 can be used as an alternative machine for the second terminal 22.

On the other hand, if the device 42 is not connected to the third terminal 23, a notification indicating that the device 42 is to be connected is performed. Therefore, the user connects the device 42 to the device interface 206 of the third terminal 23. In this way, if all the necessary devices 42 are connected to the third terminal 23, it is notified that the third terminal 23 is available. That is, the third terminal 23 can be used as an alternative machine for the second terminal 22.

As described in detail above, in the case of the store system 100 using the relay server 10 including the detection unit 111, the acquisition unit 112, and the processing unit 113, even if the first terminal 21 or the second terminal 22 fails and is down, the third terminal 23 can be used as an alternative machine for the failed first terminal or second terminal, only by connecting the third terminal 23 to the first communication network 30, and connecting the device 41 or device 42 required as the first terminal 21 or the second terminal 22 to the third terminal 23. At that time, the user who is in charge of the work may just connect the device to the third terminal 23 and turn the power on in the same form as the failed terminal, without being aware of the software configuration or set values required for the first terminal 21 or the second terminal 22. Therefore, it is possible to achieve the effect of recovering the system quickly and with a simple operation from the abnormality of the terminal.

Moreover, the relay server 10 has a function as the notification unit 114. Therefore, if a failure occurs in the first terminal 21 or the second terminal 22 in operation, the user is promptly notified, so that the time when the system is down can be shortened as much as possible.

Further, the relay server 10 has a function as the output unit 115. Therefore, in a state where the third terminal was connected but is not connected to the first communication network 30 as an alternative machine, that fact is output, so that the user can connect the device 41 or the device 42 required for the third terminal 23 without omission.

Modification Example

The above embodiment illustrates a case where the host server 60 manages the container file 90. The server that manages the container file 90 is not limited to the host server 60. For example, the relay server 10 may manage the container file 90. In this case, the process of ACT 23 in FIG. 10 is omitted.

In the above embodiment, the relay server 10 recognizes that the operating terminal 241 whose response signal to the state monitoring signal is interrupted is the operating terminal 241 that is down due to a failure. The recognition method of the operating terminal 241 that is down due to a failure is not limited to this. For example, if the value included in the response signal indicates an abnormal value, it is possible to recognize the abnormality of the operating terminal 241.

In the above embodiment, the relay server 10 is described as one aspect of the monitoring device. The monitoring device may not be the relay server 10. For example, the host server 60 can also function as a monitoring device. Further, the relay server 10 and the host server 60 may cooperate with each other to function as the monitoring device. In this case, for example, it is conceivable that the relay server 10 has the functions as the detection unit 111 and the processing unit 113, and the host server 60 has the functions as the acquisition unit 112, the notification unit 114, and the output unit 115. Further, it is conceivable that the relay server 10 includes at least one of the notification unit 114 and the output unit 115. Of course, other combinations may be used.

The system to which the embodiment is applied is not limited to the store system 100 of the retail store. Since the use of the general-purpose terminal 20 is not particularly limited, the embodiment can be applied to various systems.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A monitoring device for a terminal including a connector to which at least one device is able to be connected and mounted with a container file storing application software for controlling a business to be performed by using the at least one device connected to the connector, wherein the at least one device is detachably connected by a user, the monitoring device comprising:
 a detector configured to detect an abnormality in the terminal;
 an acquisition component configured to acquire a container file mounted on the terminal in which the abnormality is detected; and
 a processor configured to install the acquired container file on an alternative terminal.

2. The monitoring device according to claim 1, further comprising:
 a notification component configured to notify that the detector detects an abnormality in the terminal.

3. The monitoring device according to claim 1, further comprising:
 an output component configured to output a connection request for the monitoring device, if the monitoring device connected to the connector of the terminal, in which the abnormality is detected, is not connected to the connector of the alternative terminal.

4. The monitoring device according to claim 1, wherein a plurality of terminals to be monitored are present, and
if the detector detects an abnormality in any one of the plurality of terminals to be monitored, the processor installs, in the alternative terminal, the container file mounted on the terminal in which the abnormality is detected.

5. The monitoring device according to claim 4, further comprising:
a storage component configured to store identification information on the container file mounted on the terminal in association with the terminal to be monitored, wherein
the processor installs, in the alternative terminal, a container file identified by the identification information stored in association with the terminal in which the abnormality is detected.

6. The monitoring device according to claim 1, wherein the terminal is a Point Of Sales business terminal.

7. The monitoring device according to claim 1, wherein the terminal is a smartphone.

8. The monitoring device according to claim 1, wherein the application software facilitates reading of barcodes.

9. The monitoring device according to claim 1, wherein the processor is comprised within a host server.

10. A monitoring method for a terminal including a connector to which at least one device is able to be connected and mounted with a container file storing application software for controlling a business to be performed by using the at least one device connected to the connector, wherein the at least one device is detachably connected by a user, the monitoring method comprising, by a computer of a monitoring device:
detecting an abnormality in the terminal;
acquiring a container file mounted on the terminal in which the abnormality is detected; and
installing the acquired container file on an alternative terminal.

11. The monitoring method according to claim 10, further comprising:
notifying that the detector detects an abnormality in the terminal.

12. The monitoring method according to claim 10, further comprising:
outputting a connection request for the monitoring device, if the monitoring device connected to the connector of the terminal, in which the abnormality is detected, is not connected to the connector of the alternative terminal.

13. The monitoring method according to claim 10, wherein
a plurality of terminals to be monitored are present, and further comprising:
if the detector detects an abnormality in any one of the plurality of terminals to be monitored, installing, in the alternative terminal, the container file mounted on the terminal in which the abnormality is detected.

14. The monitoring method according to claim 13, further comprising:
storing identification information on the container file mounted on the terminal in association with the terminal to be monitored; and
installing, in the alternative terminal, a container file identified by the identification information stored in association with the terminal in which the abnormality is detected.

15. The monitoring method according to claim 10, further comprising:
facilitating reading of barcodes by the application software.

16. A monitoring system for a retail store comprising a monitoring device and a plurality of terminals, each terminal including a connector to which at least one device is able to be connected and mounted with a container file storing application software for controlling a business to be performed by using the at least one device connected to the connector, wherein the at least one device is detachably connected by a user, the monitoring device comprising:
a detector configured to detect an abnormality in the terminal;
an acquisition component configured to acquire a container file mounted on the terminal in which the abnormality is detected; and
a processor configured to install the acquired container file on an alternative terminal.

17. The monitoring system according to claim 16, further comprising:
a notification component configured to notify that the detector detects an abnormality in the terminal.

18. The monitoring system according to claim 16, further comprising:
an output component configured to output a connection request for the monitoring device, if the monitoring device connected to the connector of the terminal, in which the abnormality is detected, is not connected to the connector of the alternative terminal.

19. The monitoring system according to claim 16, wherein
a plurality of terminals to be monitored are present, and
if the detector detects an abnormality in any one of the plurality of terminals to be monitored, the processor installs, in the alternative terminal, the container file mounted on the terminal in which the abnormality is detected.

20. The monitoring system according to claim 19, further comprising:
a storage component configured to store identification information on the container file mounted on the terminal in association with the terminal to be monitored, wherein
the processor installs, in the alternative terminal, a container file identified by the identification information stored in association with the terminal in which the abnormality is detected.

* * * * *